(12) United States Patent
Deguchi et al.

(10) Patent No.: US 11,342,873 B2
(45) Date of Patent: May 24, 2022

(54) CONTROLLER FOR SWITCHED RELUCTANCE MOTOR

(71) Applicant: Toyota Jidosha Kabushiki Kaisha, Toyota (JP)

(72) Inventors: Junichi Deguchi, Susono (JP); Hideki Kubonoya, Toyota (JP); Tadashi Fujiyoshi, Susono (JP); Yuki Iwama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/276,975

(22) Filed: Feb. 15, 2019

(65) Prior Publication Data
US 2019/0267924 A1 Aug. 29, 2019

(30) Foreign Application Priority Data
Feb. 28, 2018 (JP) .............................. JP2018-034884

(51) Int. Cl.
*H02K 16/00* (2006.01)
*H02P 25/092* (2016.01)
*H02K 19/10* (2006.01)
*B60L 50/61* (2019.01)

(52) U.S. Cl.
CPC ........... *H02P 25/092* (2016.02); *H02K 19/10* (2013.01); *B60L 50/61* (2019.02)

(58) Field of Classification Search
CPC ...... H02K 19/10; H02P 25/092; B60W 10/00; B60W 10/08; B60W 10/18; B60W 10/24; B60W 10/26; B60W 10/28; B60W 2510/244; B60W 30/18127

USPC .............................................. 318/701, 400.41
See application file for complete search history.

(56) References Cited

U.S. PATENT DOCUMENTS

| | | | | |
|---|---|---|---|---|
| 5,941,328 A | * | 8/1999 | Lyons ..................... | B60L 50/61 180/65.245 |
| 7,839,013 B2 | * | 11/2010 | Nakamura ............ | B60W 20/00 307/9.1 |
| 8,509,975 B2 | * | 8/2013 | Izumi .................... | B60W 20/13 701/22 |
| 9,366,339 B2 | * | 6/2016 | Kamada .................. | H02P 29/62 |

(Continued)

FOREIGN PATENT DOCUMENTS

| CN | 104718101 A | 6/2015 |
|---|---|---|
| EP | 3471263 A1 | 4/2019 |

(Continued)

*Primary Examiner* — Muhammad S Islam
*Assistant Examiner* — Zemenay T Truneh
(74) *Attorney, Agent, or Firm* — Dinsmore & Shohl LLP

(57) ABSTRACT

A controller for a switched reluctance motor, which includes a rotor, a stator, and coils wound around the stator and which is mounted on a vehicle as a traveling drive source, the controller including: a control unit performing regenerative control to apply a positive voltage and a negative voltage to the coils so that a current value of the coils becomes a first target current value in a predetermined regenerative region. Further, when the battery charge state value is a predetermined value or more, the control unit reduces a section where a negative voltage is applied to the coils to be narrower than that in a case where a battery charge state value is less than the predetermined value.

5 Claims, 6 Drawing Sheets

(56) References Cited

U.S. PATENT DOCUMENTS

| | | | | |
|---|---|---|---|---|
| 2013/0066497 | A1* | 3/2013 | Nissato | B60W 20/13 701/22 |
| 2015/0258897 | A1 | 9/2015 | Okada et al. | |
| 2015/0318772 | A1* | 11/2015 | Jahshan | B60L 50/66 318/400.41 |
| 2016/0121874 | A1* | 5/2016 | Muto | B60K 6/26 701/22 |

FOREIGN PATENT DOCUMENTS

| | | | | |
|---|---|---|---|---|
| JP | 2009-227221 A | | 10/2009 | |
| JP | 2014237372 A | | 12/2014 | |
| JP | WO-2017/217102 | * | 1/2017 | |
| JP | WO 2017217102 | * | 4/2017 | H02P 25/08 |
| WO | 2017217102 A1 | | 12/2017 | |

* cited by examiner

CONTROLLER FOR SWITCHED RELUCTANCE MOTOR

CROSS-REFERENCE TO RELATED APPLICATION(S)

The present application claims priority to and incorporates by reference the entire contents of Japanese Patent Application No. 2018-034884 filed in Japan on Feb. 28, 2018.

BACKGROUND

The present disclosure relates to a controller for a switched reluctance motor.

There is a known switched reluctance motor including a stator and a rotor having respective salient poles facing each other and three-phase coils wound around the salient poles of the stator and using the magnetic attractive force generated between the salient poles of the stator and the rotor so as to rotate the rotor.

Regarding such a switched reluctance motor, for example, Japanese Laid-open Patent Publication No. 2014-237372 discloses a technique of providing a switched reluctance motor as a traveling drive source to perform regenerative control of the switched reluctance motor.

With the technique disclosed in Japanese Laid-open Patent Publication No. 2014-237372, however, in a case where State Of Charge ((SOC): battery charge state value) is a predetermined value or more, for example, the battery is fully charged, the execution of charging using regenerative control may reduce the life of the battery.

SUMMARY

There is a need for providing a controller for a switched reluctance motor controller capable of suppressing reduction in battery life during regenerative control.

According to an embodiment, a controller for a switched reluctance motor, which includes a rotor, a stator, and coils wound around the stator and which is mounted on a vehicle as a traveling drive source, the controller including: a control unit performing regenerative control to apply a positive voltage and a negative voltage to the coils so that a current value of the coils becomes a first target current value in a predetermined regenerative region. Further, when the battery charge state value is a predetermined value or more, the control unit reduces a section where a negative voltage is applied to the coils to be narrower than that in a case where a battery charge state value is less than the predetermined value.

DETAILED DESCRIPTION

A controller for a switched reluctance motor according to embodiments of the present disclosure will be described with reference to the accompanying drawings. Note that the present disclosure is not limited to the following embodiments. Note that the elements described in the following embodiments include elements that can be easily replaced by a person skilled in the art and elements that are substantially the same as the elements described below.

System Configuration

Figure 1:
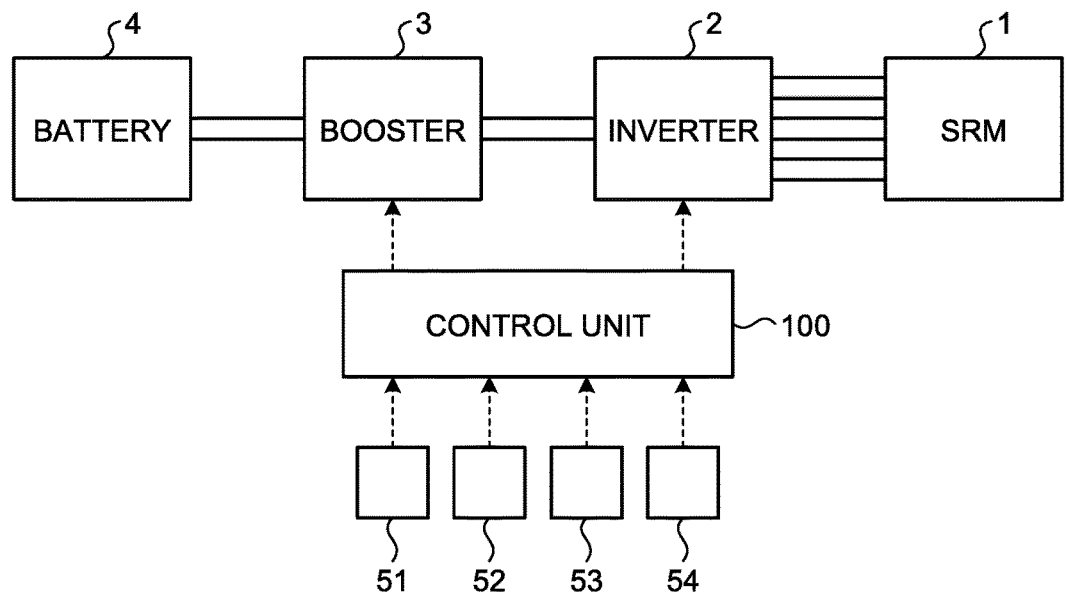
FIG. 1 is a diagram schematically illustrating an example system configuration including a controller for a switched reluctance motor according to an embodiment of the present disclosure.

As illustrated in FIG. 1, an example system configuration of an embodiment of the present disclosure includes a switched reluctance motor (hereinafter simplified as an "SR motor") 1, an inverter 2, a booster 3, a battery 4, and a control unit 100. A controller for the SR motor 1 according to an embodiment of the present disclosure includes at least the inverter 2 and the control unit 100.

The SR motor 1 is mounted on a vehicle and serves as a traveling drive source. As illustrated in FIG. 1, the SR motor 1 is electrically connected to the battery 4 via the inverter 2 and the booster 3. The SR motor 1 and the inverter 2 are electrically connected via coils 12 (refer to FIG. 2). As will be described below, the SR motor 1 functions as an electric motor when power running control is performed and functions as a generator when regenerative control is performed.

Figure 2:
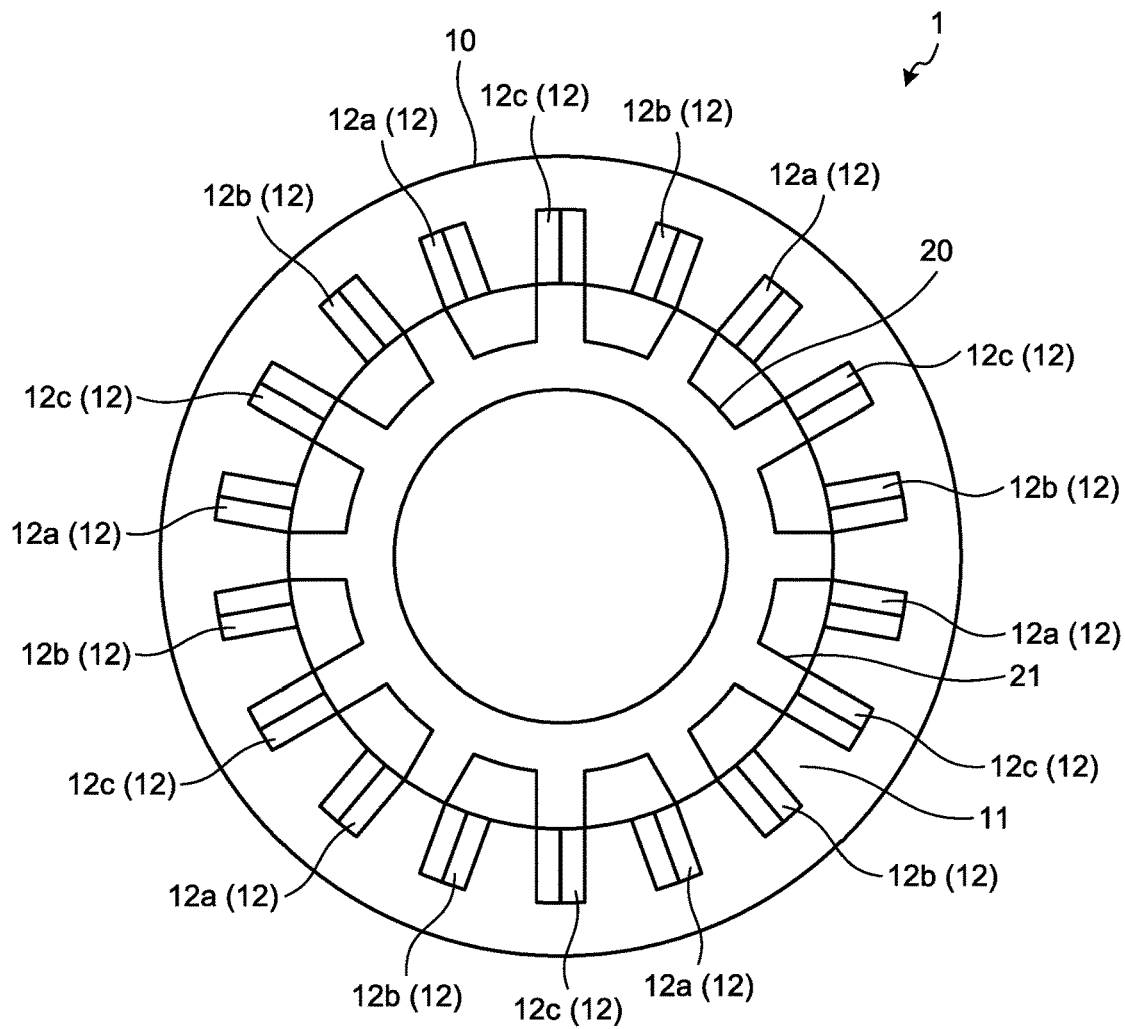
FIG. 2 is a diagram schematically illustrating an example configuration of the switched reluctance motor of FIG. 1.

The SR motor 1 is an electric motor which does not use a permanent magnet as a rotator and is driven by an excitation current (hereinafter may be simplified as a "current") flowing through the three-phase coils 12 wound around a stator 10. As illustrated in FIG. 2, the SR motor 1 includes the stator 10 having a salient pole structure and a rotor 20 having a salient pole structure. Note that FIG. 1 illustrates an example configuration of the SR motor 1 including eighteen poles of the stator 10 and twelve poles of the rotor 20.

The SR motor 1 includes a U-phase constituted by a stator tooth 11 and a coil 12a as a pair, a V-phase constituted by a stator tooth 11 and a coil 12b as a pair, and a W-phase constituted by a stator tooth 11 and a coil 12c as a pair.

As illustrated in FIG. 2, the stator 10 includes a plurality of the stator teeth 11 as salient poles on an inner peripheral portion of an annular structure. The coil 12 connected to the inverter 2 is wound around each of the stator teeth 11.

The rotor 20 is disposed radially inward of the stator 10, and includes a plurality of rotor teeth 21 as salient poles on an outer peripheral portion of the annular structure. Note that the rotor 20 rotates together with a rotor shaft (not illustrated).

Figure 3:
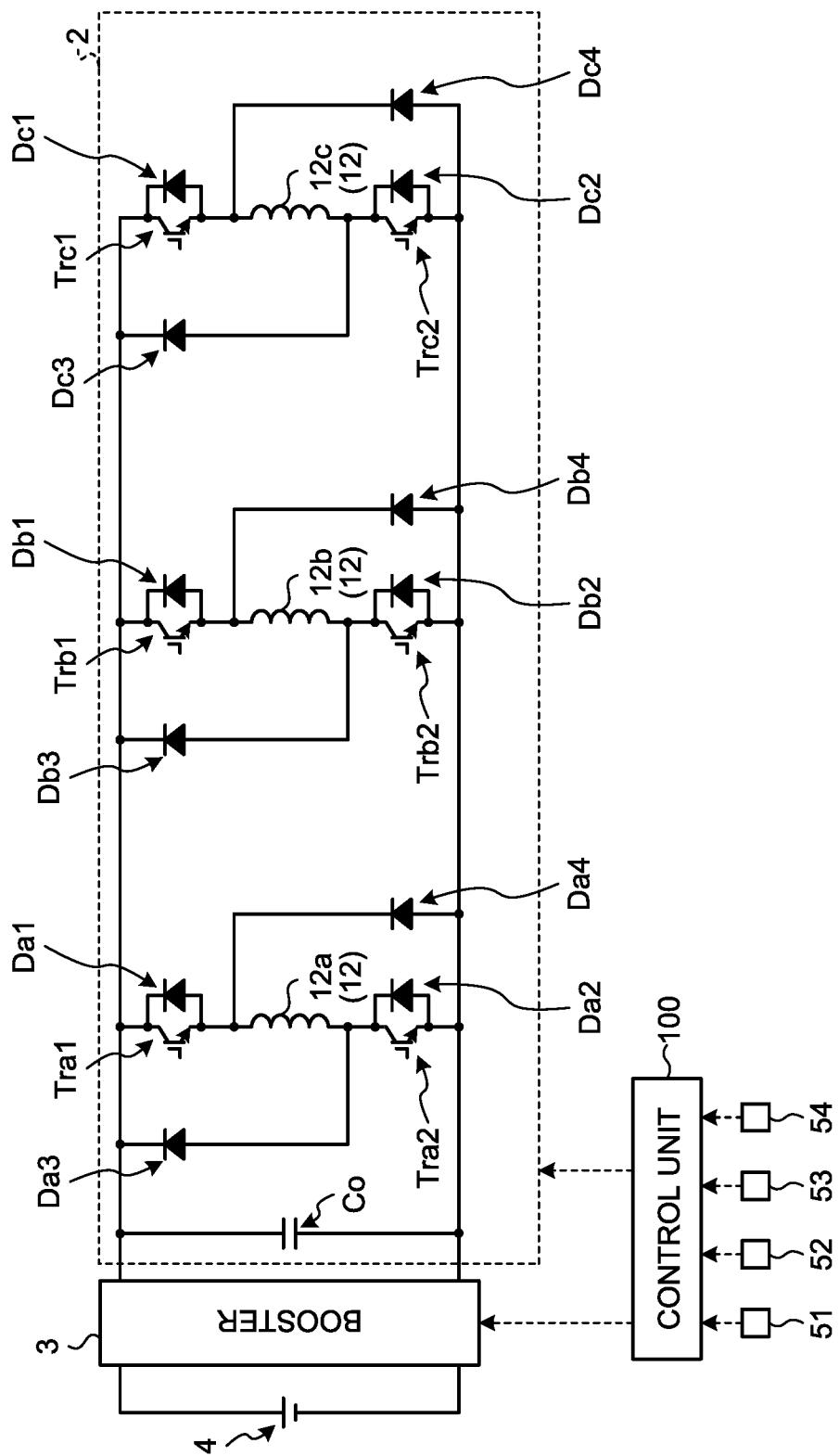
FIG. 3 is a diagram schematically illustrating an example configuration of an inverter of the system of FIG. 1.

As illustrated in FIG. 3, the inverter 2 includes an electric circuit (inverter circuit) having a plurality of switching elements so that a three-phase alternating current is supplied to the coils. As illustrated in the figure, the inverter 2 includes three asymmetrical halfbridge circuits connected in parallel to each other. The inverter 2 can independently excitate the coils 12a, 12b, and 12c of the phases included in the respective half-bridge circuits and can perform independent control on currents flowing through the coils 12a, 12b, and 12c of the phases. That is, the SR motor 1 can drive on a single phase basis, and has a feature that it hardly generates heat, for example, even when a high torque is continuously output.

Meanwhile, as a motor to be mounted on the vehicle, besides the SR motor 1, there is a known Permanent Magnet synchronous motor (hereinafter referred to as a "PM motor"). The inverter of the PM motor is constituted with a full bridge circuit. The inverter of the PM motor cannot independently excite the coils of phases, making it difficult to independently control the current flowing through the coils of the phases. That is, the PM motor cannot drive on a single phase basis, and it is likely to generate heat when, for example, a high torque is continuously output.

The inverter circuit of the inverter 2 includes a plurality of transistors and a plurality of diodes provided for each of the phases, and a capacitor Co. The inverter 2 simultaneously turns on or off a plurality of transistors in each of the phases to change the value of the current flowing through the coils 12.

The inverter 2 includes transistors Tra1 and Tra2 and diodes Da1, Da2, Da3, and Da4 around the U-phase coil 12a. The inverter 2 further includes transistors Trb1 and Trb2 and diodes Db1, Db2, Db3, and Db4 around the V-phase coil 12b. The inverter 2 further includes transistors Trc1 and Trc2 and diodes Dc1, Dc2, Dc3, and Dc4 around the W-phase coil 12c.

Unlike an inverter of a general PM motor, the inverter 2 includes two additional diodes to each of the phases (diodes Da3, Da4, Db3, Db4, Dc3, and Dc4), enabling application of the current in direct current. Furthermore, unlike the inverter of a general PM motor, since the inverter 2 does not have a neutral point, it is possible to control each of the phases under independent excitation conditions.

The booster 3 is provided between the inverter 2 and the battery 4 and boosts the voltage to be applied to the SR motor 1. The booster 3 includes, for example, a boost converter and is controlled by the control unit 100.

The control unit 100 is an Electronic Control Unit (ECU) that performs drive control of the SR motor 1. The control unit 100 includes a Central Processing Unit (CPU), a storage that stores data including various programs, and a calculation unit that performs various calculations for performing drive control of the SR motor 1. As a result of the calculation in the calculation unit, a command signal for controlling the inverter 2 is output from the control unit 100 to the inverter 2. In this manner, the control unit 100 controls the inverter 2 to control the voltage and current to be applied to the SR motor 1.

The control unit 100 is connected to a rotation speed sensor 51, an accelerator opening degree sensor 52, a vehicle speed sensor 53, and a temperature sensor 54. Specifically, the rotation speed sensor 51 is constituted by a resolver, detects the rotation speed of the rotor 20 of the SR motor 1, and then outputs a corresponding detection signal (resolver signal) to the control unit 100. The accelerator opening degree sensor 52 detects the driver's depression amount of the accelerator pedal, and outputs a corresponding detection signal to the control unit 100. The vehicle speed sensor 53 detects the running speed of the vehicle and outputs a corresponding detection signal to the control unit 100. The temperature sensor 54 detects the temperature of the coil 12, and outputs a corresponding detection signal to the control unit 100. The control unit 100 is capable of obtaining a State-Of-Charge value (hereinafter simplified as an "SOC") as a charge state value of the battery 4 via the inverter 2.

The control unit 100 performs control by specifying a relative positional relationship between the stator tooth 11 and the rotor tooth 21 in the rotational direction based on the detection signal input from the rotation speed sensor 51 and then, on the basis of the positional relationship, repeating the switching of the coils 12 as energization targets for each of the phases. By the control, the control unit 100 causes a current to flow through the coil 12 of a certain phase to excite the stator teeth 11 to generate a magnetic attractive force between the stator teeth 11 and the rotor teeth 21 near the stator teeth 11 so as to rotate the rotor 20.

Figure 4:
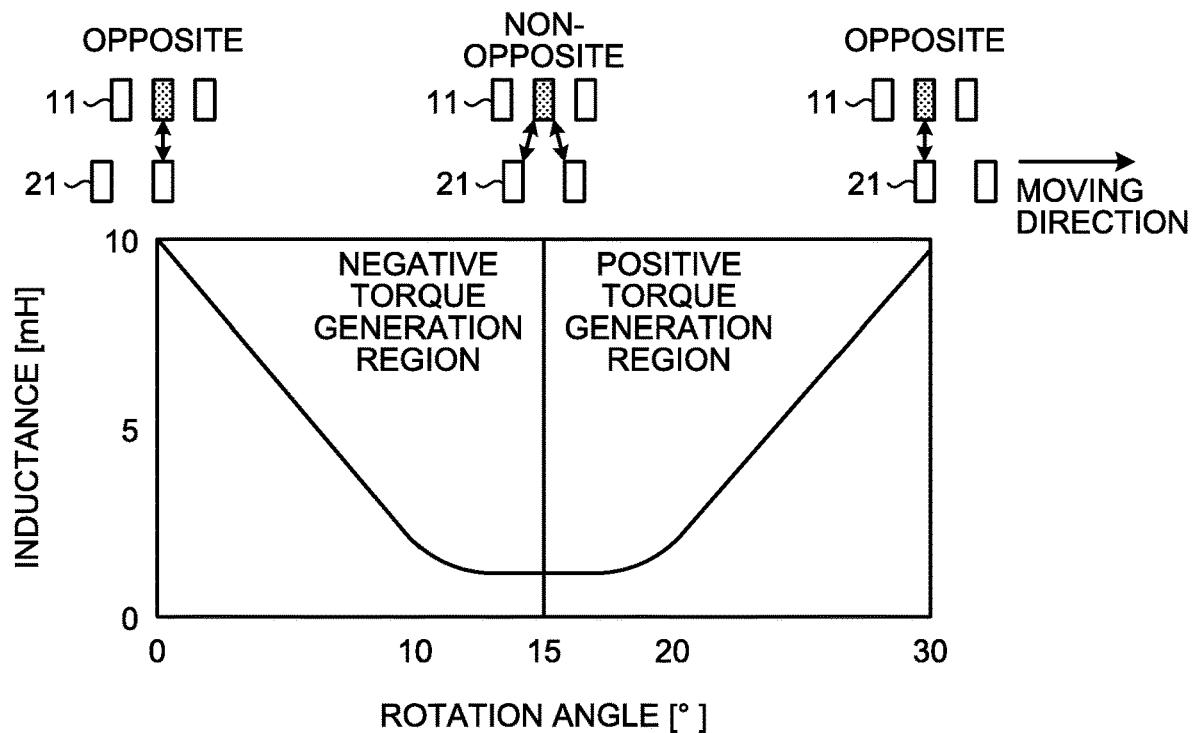
FIG. 4 is a graph illustrating a regenerative region (negative torque generation region) in which regenerative control is performed and a power running region in which power running control is performed (positive torque generation region), the regenerative control and the power running control being performed by the controller of FIG. 1.

As illustrated in FIG. 4, the control unit 100 performs regenerative control of the SR motor 1 in a negative torque generation region (hereinafter referred to as a "regenerative region") in which the inductance has a negative slope, while performing power running control of the SR motor 1 in a positive torque generation region (hereinafter referred to as a "power running region") in which the inductance has a positive slope. In the example illustrated in the figure, a rotation angle range of 0° to 15° of the rotor tooth 21 corresponds to the regenerative region, and a rotation angle range of 15° to 30° of the rotor tooth 21 corresponds to the power running region.

Figure 5:
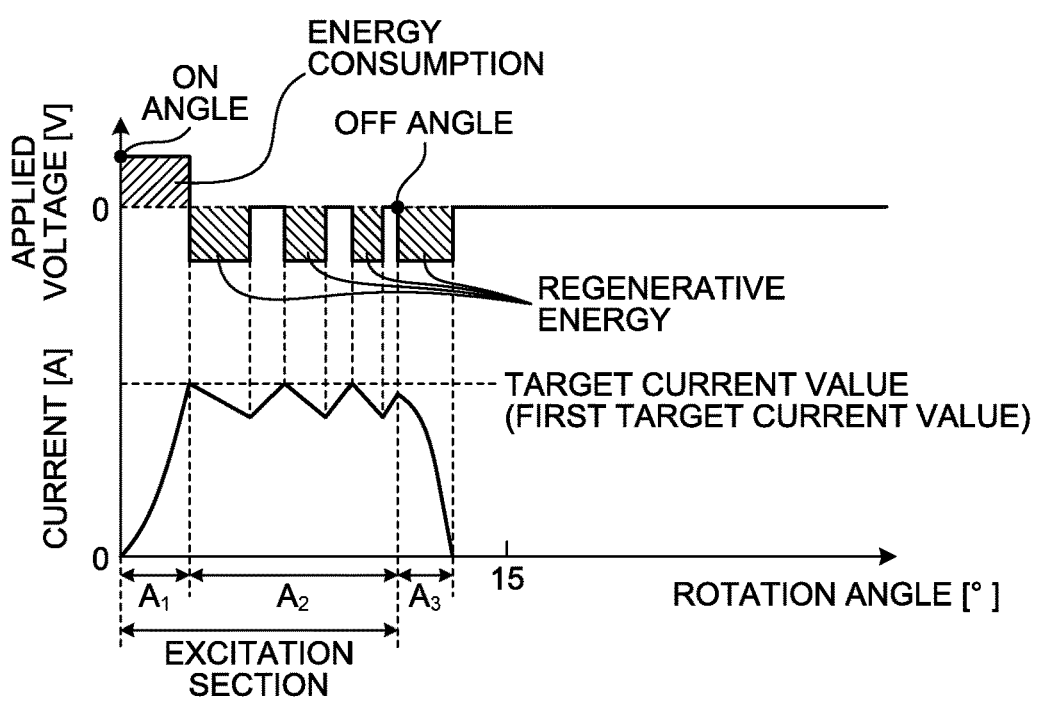
FIG. 5 is a diagram illustrating an example of an applied voltage and a current waveform when normal regenerative control (first regenerative control) is performed in the system of FIG. 1.

As illustrated in FIG. 5, the control unit 100 starts to cause a current to flow through the coil 12 as an excitation target in a case where the rotation angle of a certain rotor tooth 21 enters an excitation section, that is, in a case where the rotation angle of a certain rotor tooth 21 reaches the ON angle (excitation start angle). In contrast, the control unit 100 sets the current flowing to the coil 12 as an excitation target to zero in a case where the rotation angle of the rotor tooth 21 is out of the excitation section, that is, in a case where the rotation angle of the rotor tooth 21 reaches the OFF angle (excitation end angle).

As illustrated in the same figure, the term "excitation section" means the rotation angle range of the rotor 20 from the ON angle to the OFF angle, that is, it indicates the section ($A_1+A_2$) from the start to the end of the excitation of a certain coil 12, rather than the section ($A_1+A_2+A_3$) during which the current flows through the coil 12. The term "ON angle" specifically refers to the excitation start angle, which is a phase at which the positive voltage starts to be applied to the coil 12 in the regenerative region. In contrast, the term "OFF angle" refers to an excitation end angle, which is a phase at which the negative voltage starts to be applied to the coil 12 in the regenerative region.

In a case where the rotation angle of the rotor tooth 21 is within a section $A_1$, the control unit 100 executes a positive voltage mode, in which a positive voltage is applied to the coil 12 to raise the current value of the coil 12. In the positive voltage mode, a positive voltage is applied to the coil 12 of the stator tooth 11 as an excitation target to cause the current value of the coil 12 to rise to a target current value.

In a case where the rotation angle of the rotor tooth 21 is within a section $A_2$, the control unit 100 executes a circulation mode, in which a negative voltage and a zero voltage are alternately applied to the coil 12 of the stator tooth 11 as an excitation target so as to cause the current value of the coil 12 to be a level close to the target current value. In this circulation mode, a zero voltage is applied to the coil 12 (that is, no voltage is applied) so as to circulate the current in the inverter 2 through the coil 12. In the section $A_2$, in which the circulation mode is executed, as illustrated in FIG. 5, the current value of the coil 12 is shifted within a predetermined current range with the target current value as an upper limit value.

In a case where the rotation angle of the rotor tooth 21 is within a section $A_3$, the control unit 100 executes a negative voltage mode, in which a negative voltage is applied to the coil 12 to lower the current value of the coil 12. In the negative voltage mode, a negative voltage is applied to the coil 12 of the stator tooth 11 as an excitation target to cause the current value of the coil 12 to be set to zero. Note that FIG. 5 illustrates an example of the applied voltage waveform and the current waveform in the regenerative control performed in the regenerative region. The horizontal axis (the rotation angle of the rotor 20) in FIG. 5 corresponds to the horizontal axis (the rotation angle of the rotor 20) in FIG. 4.

Here, the control unit 100 performs first regenerative control and second regenerative control as the regenerative control of the SR motor 1. The first regenerative control is regenerative control performed in a normal state, specifically, in a case where the SOC is less than a predetermined value (for example, in a case where the battery 4 is not fully charged). As illustrated in FIGS. 4 and 5, the control unit 100 applies, in the first regenerative control, a positive voltage and a negative voltage to the coil 12 in the regenerative region so that the current value of the coil 12 becomes the target current value (first target current value). Note that the "actual regenerative energy", which is finally obtained by regeneration, in FIG. 5 corresponds to the energy calculated by subtracting the "energy consumption", consumed at the time of application of positive voltage, from the "regenerative energy" obtained at the time of application of negative voltage (i.e., "actual regenerative energy"="regenerative energy"−"energy consumption").

Figure 6:
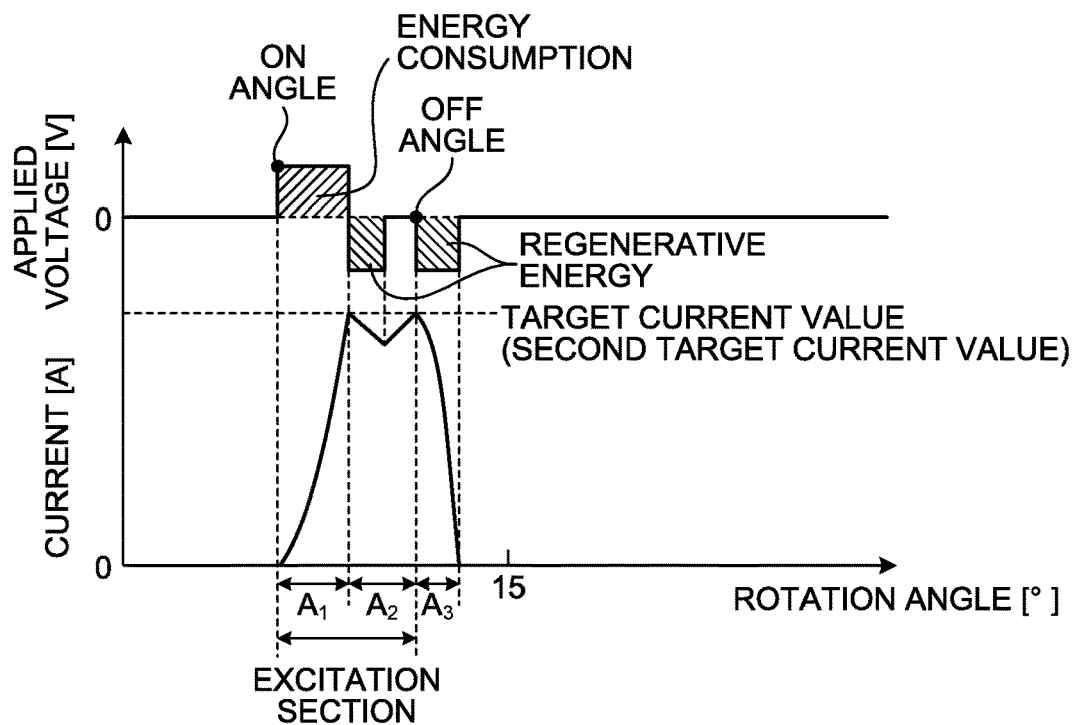
FIG. 6 is a diagram illustrating an example of the applied voltage and the current waveform at execution of regenerative control (second regenerative control) in a case where a battery charge state value is a predetermined value or more in the system of FIG. 1.

The second regenerative control is performed in a case where the SOC is a predetermined value or more (for example, in a case where the battery 4 is fully charged). In the second regenerative control, as illustrated in FIG. 6, the control unit 100 reduces the section in which the negative voltage is applied to the coil 12 to be narrower than the case of the first regenerative control (refer to FIG. 5). That is, in the second regenerative control, the application section of the negative voltage is reduced as compared with the first regenerative control so as to reduce the regenerative energy amount. The horizontal axis (the rotation angle of the rotor 20) in FIG. 6 corresponds to the horizontal axis (the rotation angle of the rotor 20) in FIG. 4.

Here, in the second regenerative control, as illustrated in FIG. 6, the control unit 100 may delay at least one of the ON angle and the OFF angle more than the case of the first regenerative control (refer to FIG. 5). In this manner, at least one of the ON angle and the OFF angle, that is, the excitation start angle or the excitation end angle is delayed in the regenerative control, making it possible in the second regenerative control to reduce the application section of the negative voltage to be narrower than in the normal state. Note that while both the ON angle and the OFF angle are delayed in FIG. 6, it is sufficient as long as at least one of the ON angle and the OFF angle is delayed.

Furthermore, as illustrated in FIG. 6, the control unit 100 may apply, in the second regenerative control, a positive voltage and a negative voltage to the coil 12 so as to set a current value of the coil 12 to be a second target current value, which is more than the first target current value (refer to FIG. 5) in the first regenerative control. In this manner, the target current value (the second target current value) during the second regenerative control is set to be more than in the normal state (the first target current value), making it possible to reduce the regenerative energy amount while suppressing the reduction in the braking force due to the narrowed application section of the negative voltage.

Note that the first target current value in the first regenerative control and the second target current value in the second regenerative control are described in an excitation condition map (not illustrated) together with the ON angle, the OFF angle or the like in the excitation section. At the time of drive control of the SR motor 1 described below, the control unit 100 derives a required driving force on the basis of the accelerator opening degree detected by the accelerator opening degree sensor 52 and reads the excitation condition map corresponding to the required driving force so as to determine the individual target current values in the first regenerative control and the second regenerative control.

Figure 7:
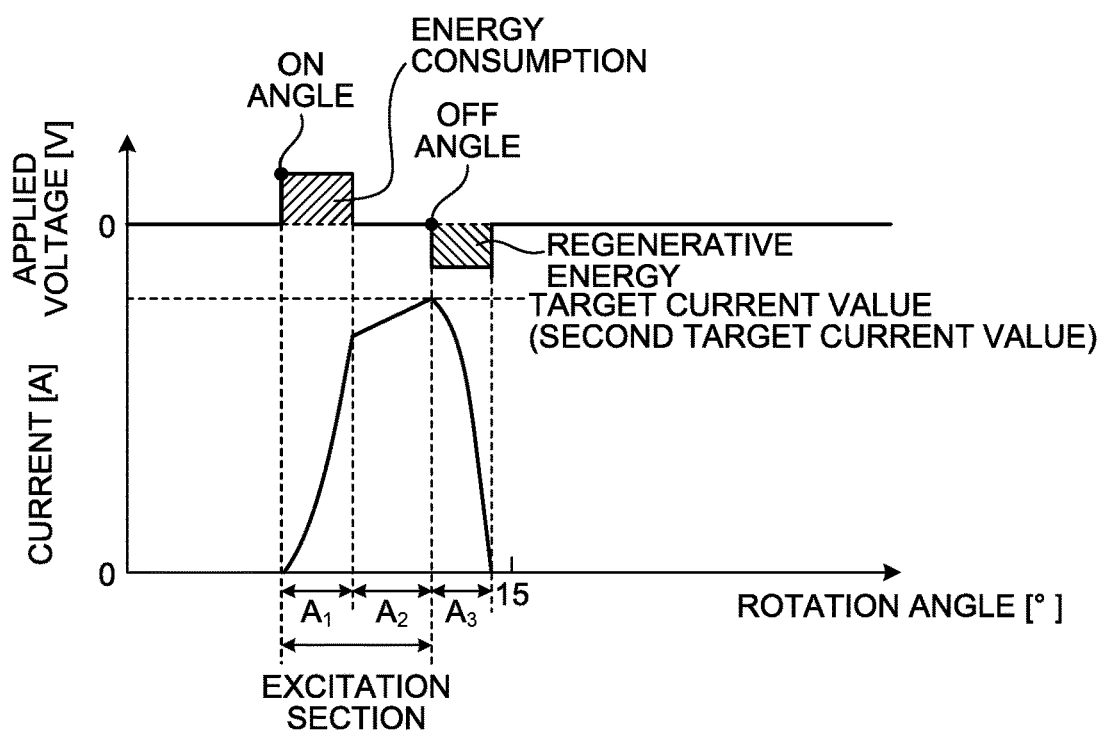
FIG. 7 is a diagram illustrating another example of the applied voltage and the current waveform at execution of regenerative control (second regenerative control) in a case where a battery charge state value is a predetermined value or more in a switched reluctance motor controller according to an embodiment of the present disclosure.

Furthermore, in the second regenerative control, as illustrated in FIG. 7, the control unit 100 may set the section in which zero voltage is applied in the circulation mode to be wider than the case of the first regenerative control (refer to FIG. 5). In this manner, the application section of the zero voltage in the circulation mode is expanded to be wider than in the normal state during the second regenerative control, making it possible to reduce the number of times of switching of the application of the negative voltage and the application of the zero voltage, leading to reduction of the switching loss in the inverter 2. Furthermore, the application section of the zero voltage in the circulation mode is expanded to be wider than in the normal state, making it possible to rectify the current waveform to reduce the hysteresis, leading to reduction of Noise and Vibration (herein after refers to "NV"). The horizontal axis (the rotation angle of the rotor 20) in FIG. 7 corresponds to the horizontal axis (the rotation angle of the rotor 20) in FIG. 4.

The control unit 100 may perform the second regenerative control on condition that the temperature of the coil 12 is a predetermined value or less in addition to the condition that the SOC is a predetermined value or more. In this manner, by executing the second regenerative control, in which the application section of the negative voltage during the regenerative control is reduced to be narrower than in the normal time only when the temperature of the coil 12 is a predetermined value or below, it is possible to suppress an increase in the thermal load on the coil 12.

In a case where there is no concern about an increase in the thermal load of the coil 12 by execution of the second regenerative control, there is no need to add the condition that "the temperature of the coil 12 is the predetermined value or less" to the condition of the second regenerative control. For example, in a case where a positive voltage and a negative voltage are applied to the coil 12 so that the current value of the coil 12 becomes the first target current value in the second regenerative control, similarly to the first regenerative control (refer to FIG. 5), it is expected that the thermal load of the coil 12 would not increase so much. In this case, there is no need to add the condition that "the temperature of the coil 12 is the predetermined value or less" to the condition of the second regenerative control.

Drive Control Method

Hereinafter, an embodiment of a drive control method by the SR motor 1 controller according to an embodiment of the present disclosure will be described with reference to FIGS. 5 to 8.

Figure 8:
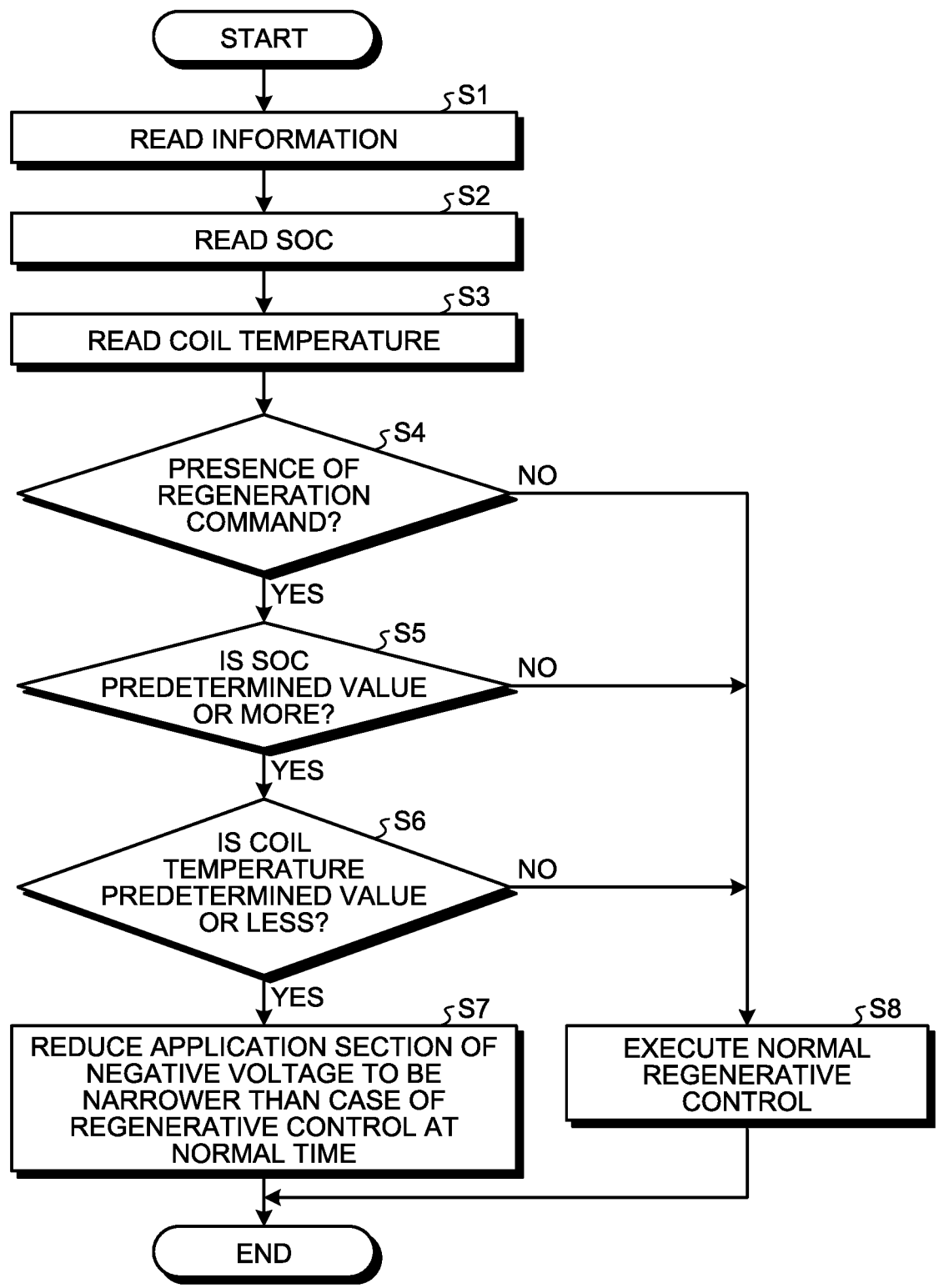
FIG. 8 is a flowchart illustrating a drive control method performed by the controller according to an embodiment of the present disclosure.

First, as illustrated in FIG. 8, the control unit 100 reads various information items used for drive control of the SR motor 1 (Step S1). The term "various information items" specifically herein refer to the rotation speed and the rotation angle (phase) of the rotor 20 based on the detection signal of the rotation speed sensor 51. Although not illustrated in the figure, the control unit 100 derives the required driving force based on the accelerator opening degree detected by the accelerator opening degree sensor 52 and reads the excitation condition map in the same step.

Next, the control unit 100 reads the SOC via the inverter 2 (Step S2). Then, the control unit 100 reads the temperature of the coil 12 on the basis of the detection signal of the temperature sensor 54 (Step S3).

Subsequently, the control unit 100 determines the presence or absence of a regeneration command (Step S4). Here, in a case where the accelerator opening degree sensor 52 has detected an accelerator OFF state or a brake sensor (not illustrated) has detected a brake ON state and whereby the required driving force becomes a negative value, the control unit 100 determines that a regeneration command is present.

In a case where it is determined in Step S4 that a regeneration command is present (Yes in Step S4), the control unit 100 determines whether the SOC is a predetermined value or more (for example, a state in which the battery 4 is fully charged) (Step S5).

In a case where it is determined in Step S5 that the SOC is a predetermined value or more (Yes in Step S5), the control unit 100 determines whether the temperature of the coil 12 is a predetermined value or less (Step S6).

In a case where it is determined in Step S6 that the temperature of the coil 12 is a predetermined value or less (Yes in Step S6), the control unit 100 executes the second regenerative control, in which the application section of the negative voltage is reduced to be narrower than that in the case of the normal regenerative control (first regenerative control) (Step S7) and then ends the process.

Specifically, as illustrated in FIG. 6, in Step S7, the control unit 100 applies a positive voltage and a negative voltage to the coil 12 so that the current value of the coil 12 becomes the target current value in the regenerative region. At that time, the control unit 100 reduces the section where the negative voltage is applied to the coil 12 narrower than that in the case of the first regenerative control (refer to FIG. 5) so as to reduce the regenerative energy amount as compared with the case of the first regenerative control.

In Step S7, as illustrated in FIG. 6, the ON angle and the OFF angle may be delayed more than that in the case of the first regenerative control (refer to FIG. 5). Furthermore, in this step, a positive voltage and a negative voltage may be applied to the coil 12 so as to set a current value of the coil 12 to be a second target current value more than the first target current value (see FIG. 5). Furthermore, in this step, as illustrated in FIG. 7, the control unit 100 may expand the section in which zero voltage is applied in the circulation mode to be wider than that in the case of the first regenerative control (see FIG. 5).

Here, in a case where denial determination is made in Steps S4 to S6, the control unit 100 executes normal regenerative control (first regenerative control) (Step S8) and then ends the process. Specifically, as illustrated in FIG. 5, in Step S8, the control unit 100 applies a positive voltage and a negative voltage to the coil 12 so that the current value of the coil 12 becomes the first target current value in the regenerative region.

As described above, the controller for the SR motor 1 according to the embodiment performs the second regenerative control, in which the application section of the negative voltage in the regenerative control is reduced to be narrower than that in the case of the normal first regenerative control in a case where the SOC is a predetermined value or more and power recovery is difficult, which makes it possible to reduce the regenerative energy amount and reduce the power recovery amount to zero or near zero, for example. Therefore, with the use of the controller for the SR motor 1 according to the embodiment, it is possible to suppress the decrease of the life of the battery 4 and to improve the durability of the battery 4.

In comparison, in a case where the battery is fully charged (SOC becomes a predetermined value or more), for example, the controller for the SR motor in the related art drives the engine to reduce the power recovery amount in order to adjust the power balance. This causes an occurrence of the engine rush-up to deteriorate the NV when the battery is fully charged, thus causing that the driver has a strange feeling. In contrast, in a case where the battery 4 is fully charged, the controller for the SR motor 1 according to the embodiment performs the second regenerative control, in which the application section of the negative voltage is reduced to be narrower than that in the case of the normal first regenerative control without driving the engine so as to reduce the power recovery amount. This would not cause the engine rush-up as in the case in the related art, making it possible to reduce the NV and alleviate the strange feeling of the driver.

Furthermore, as illustrated in FIGS. 4 and 5, the controller for the SR motor controller in the related art performs excitation of the coil 12 in a wide range in the regenerative region so as to perform power recovery with high efficiency. In contrast, the controller for the SR motor 1 according to the embodiment delays the ON angle and the OFF angle to intentionally perform power recovery with low efficiency in a range narrower than that in the related-art case, so as to avoid full charge of the battery 4. Note that this control is specific to the SR motor 1 capable of independently controlling the current flowing through the coil 12 of each of the phases, and thus, this control cannot be performed in a PM motor or the like, which cannot perform independent control on the current flowing through the coil 12 of each of the phases.

Application Example

Figure 9:
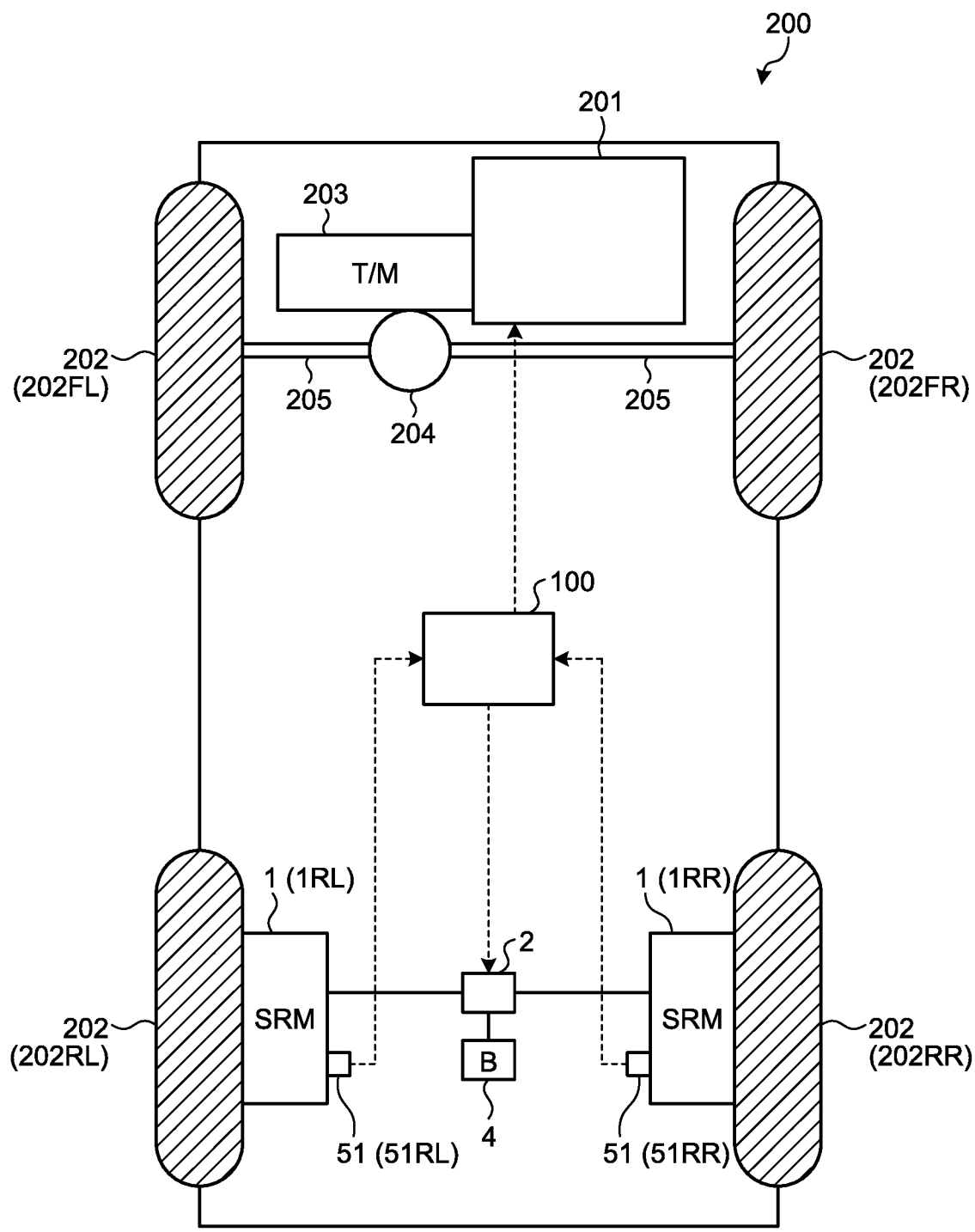
FIG. 9 is a skeleton diagram illustrating a vehicle including the controller according to an embodiment of the present disclosure.

Hereinafter, a vehicle including the controller for the SR motor 1 according to the embodiment will be described with reference to FIG. 9. A vehicle 200 illustrated in the figure includes an engine 201 as a front-side drive device, wheels 202, a transmission (T/M) 203, a differential gear 204, a drive shaft 205, and the SR motors (SRM) 1 as a traveling drive sources. The vehicle 200 is a four-wheel drive vehicle, in which the engine 201 drives left and right front wheels 202FL and 202FR, while the SR motors 1 as rear motors drive left and right rear wheels 202RL, 202RR.

The SR motor 1 is so-called an "in-wheel motor" and is provided for each of the left and right rear wheels 202RL and 202RR. In a rear-side drive device of the vehicle 200, a left rear SR motor 1RL is connected to the left rear wheel 202RL, while a right rear SR motor 1RR is connected to the right rear wheel 202RR. Each of the left and right rear wheels 202RL and 202RR is rotatable independently of each other.

The left rear wheel 202RL is driven by the output torque (motor torque) of the left rear SR motor 1RL. The right rear wheel 202RR is driven by the output torque (motor torque) of the right rear SR motor 1RR.

The left rear SR motor 1RL and the right rear SR motor 1RR are connected to the battery (B) 4 via the inverter 2. In addition, the left rear SR motor 1RL and the right rear SR motor 1RR function as electric motors by electric power supplied from the battery 4 and also function as generators for converting torque (external force) transmitted from the rear wheels 202RL and 202RR, respectively, into electric power. The inverter 2 includes an electric circuit for the left rear SR motor 1RL and an electric circuit for the right rear SR motor 1RR.

The control unit 100 controls the left rear SR motor 1RL and the right rear SR motor 1RR, and the engine 201. For example, the control unit 100 includes an SR motor control unit (SR motor ECU) and an engine control unit (engine ECU). In this case, the engine ECU executes engine torque control of adjusting the output torque of the engine 201 to a target torque value by performing intake control, fuel injection control, ignition control or the like. In addition, the SR motor ECU executes motor control for the left rear SR motor 1RL and the right rear SR motor 1RR on the basis of the resolver signal input from the rotation speed sensor 51. The rotation speed sensor 51 includes: a left rear rotation speed sensor 51RL for detecting the rotation speed of the left rear SR motor 1RL; and a right rear rotation speed sensor 51RR for detecting the rotation speed of the right rear SR motor 1RR.

As described above, the controller for the switched reluctance motor according to the present disclosure has been specifically described by way of embodiments for carrying out the disclosure. The scope of the present disclosure is not limited to these descriptions, and should be interpreted broadly on the basis of the description of appended claims. It goes without saying that various alterations and modifications of these descriptions are included in the scope of the present disclosure.

For example, the controller for the SR motor 1 according to the embodiment may include a step-down unit (step-down converter) that steps down the voltage applied to the SR motor 1 in place of the booster 3 (refer to FIG. 1).

The application example of the controller for the SR motor 1 according to the embodiment is not limited to the one illustrated in FIG. 9 (hereinafter referred to as an "application example 1"). For example, unlike the application example 1, an application example of the controller for the SR motor 1 may have a configuration in which the front-side drive device (such as the engine 201) is not provided and the SR motor 1 is provided for all the wheels 202 (application example 2). Furthermore, unlike the application example 1, an application example may be a rear-wheel drive vehicle in which the SR motor 1 is provided on the left and right front wheels 202FL and 202FR, and the rear-side drive device (the engine 201, etc.) is provided in place of the front-side drive device (application example 3).

Unlike the application examples 1 to 3, an application example of the controller for the SR motor 1 may be a configuration in which the traveling drive source of the vehicle 200 is the SR motor 1 as the in-wheel motor alone (application example 4). Furthermore, unlike the application example 4, it is allowable to have a configuration in which the SR motor 1 is not the in-wheel motor (application example 5).

Unlike the application example 5, an application example of the controller for the SR motor 1 may further include the front-side drive device (the engine 201, etc.) of the application example 1 (application example 6). Further, unlike the application example 3, it is allowable to have a configuration in which the rear-side drive device (the engine 201 or the like) is not provided or in which the arrangement of the drive device is reversed between the front side and the rear side unlike the application example 4 (application example 7).

Here, the SR motor 1 according to an embodiment may be mounted on the rear side of the vehicle, for example, the configurations of application examples 1, 2, and 4 to 6 may be selected out of application examples 1 to 7. Generally, the regenerative energy amount obtained on the rear side of the vehicle is smaller than the amount obtained on the front side of the vehicle. Therefore, by installing the SR motor 1 on the rear side of the vehicle and executing the second regenerative control in a case where it is difficult to recover the electric power, for example, the power recovery amount can easily be set to zero or near zero.

According to an embodiment, in a case where the battery charge state value is a predetermined value or more and power recovery is difficult, the controller for the switched reluctance motor reduces the application section of the negative voltage during regenerative control to be narrower than that in the normal state, which makes it possible to reduce the regenerative energy amount and to reduce the power recovery amount.

According to an embodiment, the controller for the switched reluctance motor controller delays at least one of the excitation start angle and the excitation end angle at the time of regenerative control, which makes it possible to reduce the application section of the negative voltage to be narrower than that in the normal state.

According to an embodiment, the controller for the switched reluctance motor increases the target current value during regenerative control to be larger than that in the normal state, which makes it possible to reduce the regenerative energy amount while suppressing the decrease in the braking force due to the narrowed application section of the negative voltage.

According to an embodiment, the controller for the switched reluctance motor expands the application section of the zero voltage in a circulation mode to be wider than that in the normal state during the regenerative control, which makes it possible to reduce the number of times of switching of the negative voltage application and the zero voltage application, leading to reduction of the switching loss.

According to an embodiment, the controller for the switched reluctance motor reduces the application section of the negative voltage during regenerative control to be narrower than that in the normal state only in when the temperature of the coil is a predetermined value or below, which makes it possible to suppress an increase in the thermal load on the coils.

According to an embodiment, the switched reluctance motor controlled by the controller is mounted on the rear side of the vehicle having an obtained regenerative energy amount smaller than that in the front side of the vehicle, which makes it easier to set the power recovery amount to zero or near zero.

With to the controller for the switched reluctance motor controller according to the present disclosure, it is possible to reduce the regenerative energy amount so as to reduce the power recovery amount to zero or near zero, for example, in a case where the power recovery is difficult, which makes it possible to suppress the decrease in the battery life and to improve the durability of the battery.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller for a switched reluctance motor including a rotor, a stator, and coils wound around the stator and being mounted on a vehicle as a traveling drive source, the controller comprising:
   a control unit configured to perform regenerative control to apply a positive voltage and a negative voltage to the coils so that a current value of the coils becomes a first target current value in a predetermined regenerative region,
   wherein in response to determination that a battery charge state value is a first predetermined value or more, the control unit is configured to adjust a timing of at least one of an excitation start angle and an excitation end angle to reduce a section where a negative voltage is applied to the coils to be narrower than a section where a negative voltage is applied to the coils in a case where the battery charge state value is less than the first predetermined value; and
   wherein in a case where the battery charge state value is the first predetermined value or more and a temperature of the coils is a second predetermined value or less, the control unit is configured to reduce the section, in which the negative voltage is applied to the coils to be narrower than a section where a negative voltage is applied to the coils in a case where the battery charge state value is less than the predetermined value.

2. The controller for the switched reluctance motor according to claim 1, wherein, in response to determination that the battery charge state value is the first predetermined value or more, the control unit is configured to delay at least one of the excitation start angle, which is a phase where a positive voltage is started to be applied to the coils in the predetermined regenerative region, and the excitation end angle, which is a phase where a negative voltage is started to be applied to the coils in the predetermined regenerative region, more than that in a case where the battery charge state value is less than the first predetermined value.

3. The controller for the switched reluctance motor according to claim 1, wherein in response to determination that the battery charge state value is the first predetermined value or more, the control unit is configured to apply a positive voltage and a negative voltage to the coils so that the current value of the coils becomes a second target current value, which is more than the first target current value.

4. The controller for the switched reluctance motor according to claim 1,
   wherein the regenerative control includes: a positive voltage mode, in which a positive voltage is applied to the coils to raise the current value of the coils; a circulation mode, in which a negative voltage and a zero voltage are alternately applied to the coils; and a negative voltage mode, in which a negative voltage is applied to the coils to lower the current value of the coils, and
   in response to determination that the battery charge state value is the first predetermined value or more, the regenerative control expands a section, in which the zero voltage is applied in the circulation mode, to be wider than that in a case where the battery charge state value is less than the first predetermined value.

5. The controller for the switched reluctance motor according to claim 1, wherein the switched reluctance motor is mounted on a rear side of the vehicle.

* * * * *